United States Patent
Bellabal et al.

(10) Patent No.: US 10,132,241 B2
(45) Date of Patent: Nov. 20, 2018

(54) METHOD OF PRODUCING SUSPENSION FOR A STRUCTURE IN A TURBOJET ENGINE USING A HYPERSTATIC TRELLIS WITH PRE-STRESSED LINK ELEMENTS

(71) Applicant: SAFRAN AIRCRAFT ENGINES, Paris (FR)

(72) Inventors: Francois Robert Bellabal, Fontainebleau (FR); Nicolas Florent, Paris (FR)

(73) Assignee: SAFRAN AIRCRAFT ENGINES, Paris (FR)

( * ) Notice: Subject to any disclaimer, the term of this patent is extended or adjusted under 35 U.S.C. 154(b) by 1090 days.

(21) Appl. No.: 14/320,795

(22) Filed: Jul. 1, 2014

(65) Prior Publication Data
US 2015/0007580 A1 Jan. 8, 2015

(30) Foreign Application Priority Data
Jul. 4, 2013 (FR) ...................................... 13 56593

(51) Int. Cl.
*F01D 25/28* (2006.01)
*F02C 7/20* (2006.01)
(Continued)

(52) U.S. Cl.
CPC ................. *F02C 7/20* (2013.01); *B21D 3/12* (2013.01); *F01D 25/24* (2013.01); *F01D 25/28* (2013.01);
(Continued)

(58) Field of Classification Search
CPC .......... F01D 25/24; F01D 25/28; F01D 25/30; F05D 2300/546; F05D 2300/60; B21D 3/12; B64D 27/262
See application file for complete search history.

(56) References Cited

U.S. PATENT DOCUMENTS 2,744,722 A * 5/1956 Orr .......................... F01D 9/065
384/321
2,938,336 A * 5/1960 Peterson ................. F01D 9/065
60/39.5
(Continued)

FOREIGN PATENT DOCUMENTS

| DE | 2 142 562 | 3/1973 |
| EP | 1 714 866 A1 | 10/2006 |
| FR | 2 964 415 A1 | 3/2012 |

OTHER PUBLICATIONS

Welsch, Win, Peening Improves Fatigue Life, Welding Design & Fabrication, Sep. 1990, pp. 38-40.*

(Continued)

*Primary Examiner* — Gerald L Sung
*Assistant Examiner* — Marc Amar
(74) *Attorney, Agent, or Firm* — Oblon, McClelland, Maier & Neustadt, L.L.P.

(57) ABSTRACT

A method of manufacturing an assembly including a first structure which is arranged to be rigidly connected to a housing of a turbojet engine; a second annular structure surrounding the first structure; and a hyperstatic trellis of connecting rods which maintains the first structure relative to the second structure, is provided. The method includes mounting the connecting rods of the hyperstatic trellis between the structures; and pre-stressing at least one of the connecting rods to a pre-determined level, which is carried out before the mounting thereof between the structures.

18 Claims, 3 Drawing Sheets

(51) Int. Cl.
*F01D 25/24* (2006.01)
*B21D 3/12* (2006.01)
*F01D 25/30* (2006.01)
*B64D 27/26* (2006.01)

(52) U.S. Cl.
CPC ........ *F01D 25/30* (2013.01); *B64D 2027/266* (2013.01); *F05D 2300/60* (2013.01); *Y02T 50/671* (2013.01); *Y10T 29/49288* (2015.01)

(56) References Cited

U.S. PATENT DOCUMENTS

| | | | | |
|---|---|---|---|---|
| 4,475,403 | A * | 10/1984 | Lentz | G01N 3/02 |
| | | | | 73/798 |
| 4,718,049 | A * | 1/1988 | Crowell | G01V 1/155 |
| | | | | 181/121 |
| 4,979,872 | A * | 12/1990 | Myers | F01D 9/065 |
| | | | | 403/131 |
| 5,076,049 | A * | 12/1991 | Von Benken | F01D 25/24 |
| | | | | 415/138 |
| 5,088,279 | A * | 2/1992 | MacGee | F02C 7/20 |
| | | | | 60/226.1 |
| 5,111,048 | A * | 5/1992 | Devitt | G01N 25/72 |
| | | | | 250/341.6 |
| 9,188,146 | B1 * | 11/2015 | Trautman | B25B 29/02 |
| 2005/0042087 | A1 * | 2/2005 | Hamer | F01D 25/30 |
| | | | | 415/211.2 |
| 2008/0105782 | A1 * | 5/2008 | Beardsley | B64D 27/26 |
| | | | | 244/54 |
| 2010/0047066 | A1 * | 2/2010 | Derenes Jacky | F01D 25/24 |
| | | | | 415/201 |
| 2010/0287950 | A1 * | 11/2010 | Heyerman | F02C 7/20 |
| | | | | 60/797 |
| 2010/0290903 | A1 * | 11/2010 | Heyerman | B64D 27/26 |
| | | | | 415/213.1 |
| 2011/0033225 | A1 * | 2/2011 | Buchin | F16C 7/026 |
| | | | | 403/119 |
| 2011/0247679 | A1 | 10/2011 | Shelef et al. | |
| 2012/0051903 | A1 * | 3/2012 | Heyerman | B64D 27/20 |
| | | | | 415/213.1 |
| 2012/0111995 | A1 * | 5/2012 | Lafont | B64D 27/18 |
| | | | | 244/54 |
| 2013/0052005 | A1 * | 2/2013 | Cloft | B64D 27/26 |
| | | | | 415/213.1 |
| 2013/0164126 | A1 * | 6/2013 | Caulfeild | F01D 25/28 |
| | | | | 415/213.1 |
| 2013/0167553 | A1 * | 7/2013 | Bellabal | F02C 7/20 |
| | | | | 60/796 |
| 2013/0252013 | A1 * | 9/2013 | Kermarrec | F16C 7/02 |
| | | | | 428/596 |
| 2015/0369131 | A1 * | 12/2015 | Wong | F01D 25/24 |
| | | | | 415/213.1 |

OTHER PUBLICATIONS

French Preliminary Search Report dated Apr. 28, 2014 in French Application 13 56593, filed on Jul. 4, 2013 ( with English Translation of Categories of Cited Documents).

* cited by examiner

METHOD OF PRODUCING SUSPENSION FOR A STRUCTURE IN A TURBOJET ENGINE USING A HYPERSTATIC TRELLIS WITH PRE-STRESSED LINK ELEMENTS

TECHNICAL FIELD

The present invention relates to the field of bypass turbojet engines comprising an elongated secondary flow duct. It relates more particularly to the design of a trellis of connecting rods for suspending the engine and the associated assembly method.

PRIOR ART

An example of a bypass turbojet engine 10 such as the one shown in FIG. 1 is attached to the aircraft fuselage, inside a nacelle 12. Basically, it comprises, in an upstream to downstream direction, a fan housing 14, an intermediate housing 16, a fan duct formed between two coaxial envelopes, the inner 18 and outer 20 envelopes respectively, and a mixer 22 of the primary flow coming from the engine and the secondary flow coming from the fan. The inner envelope 18 of the portion of the engine through which the primary flow passes terminates with the exhaust housing with a terminal ring 23 forward of the mixer 22. The outer envelope 20 of the fan duct extends upstream of the region of confluence between the primary flow 26 and the secondary flow 28 where the two flows are mixed by the mixer 22. The outer fan duct 20, referred to in the technical field by the acronym OFD, has a structural function by taking up the stresses between the engine and the aircraft on which it is mounted.

The engine can be mounted beneath the aircraft wing or alternatively along its fuselage, in particular towards the rear. In this case the engine comprises a fan duct, as described above. The fasteners 17 and 27 of the engine to the aircraft are situated in the region of two transverse planes: an upstream plane passing through the intermediate housing 16 and a downstream plane passing through the exhaust housing 23. The engine is fixed to the aircraft upstream by a fastener 17 which is rigidly connected to the intermediate housing 16.

For the downstream attachment where mounting is on the fuselage, a structural ring 21 is provided on the outer fan duct OFD, said ring being connected by arms or connecting rods 40 to the collar or outer ring 23 of the exhaust housing. U.S. Pat. No. 8,272,203 in the name of the applicant describes a structural example of an outer fan duct.

The link between the above two rings may take the form of radial arms distributed all around the axis of the engine and fixed rigidly to the two rings. The link may also take the form of a trellis of connecting rods which slope relative to the radial directions. The connecting rods are fixed to the two rings by yoke-type fasteners and a pin. A fastener of this type is made up of two yokes, single or double, one of which is rigidly connected to the end of the connecting rod and the other to the wall of the ring and are passed through by a common pin. Whatever the angle of inclination of the connecting rods, the assembly that uses them for suspending the inner ring is referred to as a trellis in the present document.

Whether the link is formed by radial arms or connecting rods, it is hyperstatic; the stresses therefore pass through all the arms or connecting rods and their intensity depends on the resilience of the components, in particular of the connecting rods of the trellis.

Furthermore, this type of trellis must be able to mechanically resist the stresses that would arise from the mass imbalance caused by the loss of a blade in the engine. There must be no risk of the engine coming loose should such a critical situation occur. The ultimate load that each suspension element must resist is defined by the maximum stresses to which it is subject in such a situation.

In the prior art, these considerations led to the connecting rods, which each work in compression at least at some turning moments of the imbalance stresses, being dimensioned to resist buckling under ultimate load. This compression resistance stress proves very restricting as it is observed that in general the connecting rod is over-sized in traction with a resistance to breakage margin of approximately 100%. The optimum performance is therefore not achieved.

Moreover, the connecting rods which pass through the secondary flow must achieve a weight/aerodynamic compromise while resisting the stresses. The problem of resistance to buckling has led to the use of hollow profiled connecting rods whereas solid connecting rods would be more advantageous in terms of cost.

The applicant has already proposed solutions for limiting the compression stress that a connecting rod of a trellis must support. WO2012/032270 proposes producing a trellis with connecting rods that have traction rigidity that is greater than the compression rigidity, which limits the compression stresses due to the hyperstatic nature of the trellis. In US2013014515, the trellis is designed with fusible elements which buckle beyond a pre-determined exceptional compression, and an arrangement of the other connecting rods designed to transmit the stresses between the rings. Both of these solutions require a suitable design of at least some portions of the connecting rods.

PRESENTATION OF THE INVENTION

The object of the invention is to provide an alternative to the above solutions for forming a suspension trellis while minimising the impact of the constraints of resistance to exceptional stresses on the weight and space requirement of the connecting rods, in particular in order to disturb the secondary flow as little as possible.

The invention relates to a method of manufacturing an assembly comprising a first structure, arranged to be rigidly connected to an engine housing of a turbojet engine, a second annular structure surrounding the first structure, and a hyperstatic trellis of connecting rods maintaining the first structure relative to the second. Said method, which comprises a step of mounting said connecting rods of the hyperstatic trellis between said structures, is noteworthy in that a step for pre-stressing at least one of said connecting rods to a pre-determined level is carried out before the mounting thereof between said structures.

The first structure may be a ring incorporated directly in the housing or an attachment part fixed to the housing with no freedom of relative movement. In addition, the assembly is not subject to any external stress (thrust, vibration, acceleration) in particular when the engine is inoperative or disassembled. As the trellis is hyperstatic, this means that the stresses passing through each connecting rod of the trellis are a function of the state of stress of the other connecting rods. As the stresses passing through a connecting rod cannot be modified, the invention modifies the state of stress in said connecting rod, in particular when external stresses due to the operating conditions of the turbojet engine are applied to the assembly. When using the invention, the maximum traction stress seen in flight is increased but this is not disadvantageous compared to the prior art because the connecting rods are already extremely over-sized in traction. However, the maximum compression stress in the connecting rod is reduced, which allows the cross-section of the connecting rod to be reduced. The invention produces a transfer of the level of stress between these two alternative cases of stress, traction stress and compression stress. It therefore gives a margin of manoeuvre for optimising the connecting rods in terms of weight and space requirement.

Moreover, the pre-stressing of a connecting rod in the engine environment is difficult and mounting the hyperstatic trellis requires precise adjustment of the connecting rods. The connecting rod must therefore be maintained in the pre-stressed state during operation. It is simpler to mount the connecting rod in the pre-stressed state before it can be released when all the connecting rods are installed.

Preferably, all the connecting rods of the trellis are mounted in a pre-stressed state. On the one hand, since the trellis is hyperstatic, stressing a connecting rod causes stressing of at least one other connecting rod in the trellis. On the other hand, as the trellis must be able to resist an accident such as the loss of an engine blade, the stresses that the connecting rods must resist will apply in all radial directions during rotation of the engine.

Advantageously, as said connecting rod comprises a spindle with a yoke at each end which is suitable for fixing to one of said structures, the method comprises the following steps:
  applying pre-stressing at said predetermined level to the yokes of said connecting rod by suitable stressing means;
  installing and locking means on board said connecting rod which are suitable for maintaining the separation of the yokes, the stressing means maintaining the pre-stressing at said predetermined level;
  releasing the pre-stressing applied to the yokes of said connecting rod by the stressing means.

The pre-stressed state corresponds to a slight lengthening of the connecting rod. The means for maintaining the separation of the yokes when it is inserted between the two yokes of the pre-stressed spindle or alternatively parallel to the spindle by normal tightening stress leading to friction, maintains the state of stress by locking the spindle in this lengthened state.

Advantageously, after mounting said connecting rod, the method comprises a sequence of removing the means for maintaining the separation of the yokes, said sequence preferably comprising a step of unlocking the locking means of said separation maintaining means.

The invention therefore also relates to means for maintaining the separation of the yokes which comprise at least one non-deformable element extending along the spindle over most of its length and means for transmitting the compression stresses applied by the pre-stressed connecting rod to said non-deformable element. These means can therefore fulfil their function statically, with no supply of energy. The means designed in this way are also of elongate form and have a cross-section that fits substantially within the envelope of the cross-sections of the spindle and of the yokes. This allows the spindles equipped with the device to be manipulated and therefore to be mounted on the trellis.

Preferably, the means for maintaining the separation of the yokes comprise locking means which are suitable for retaining the non-deformable element along the spindle in order to maintain the separation of the yokes.

In a first embodiment, said yokes having a larger cross-section than the spindle in at least the direction perpendicular to the spindle, the means for maintaining the separation of the yokes are characterised in that the non-deformable element has at least two contact surfaces which are oriented outwards in opposite directions and suitable for resting on the face of said yokes which is turned towards the spindle. Because the spindle rests on the yokes, the portion that must cooperate with the pins in order to fix the connecting rod to the yokes on the two structures connected by the trellis can be kept free.

In a second embodiment, the means for maintaining the pre-stressed state are characterised in that they comprise tightening means which are suitable for applying pressure to the non-deformable element against the spindle, preventing said spindle from retracting by friction against the non-deformable element. Compared to the first embodiment, this variant allows the support of the spindle on the yokes to be dispensed with and provides better freeing of the space surrounding the connection means for mounting the connecting rod on the turbojet engine.

DESCRIPTION OF AN EMBODIMENT OF THE INVENTION

The present invention will be more readily understood and other details, features and advantages of the present invention will appear more clearly on reading the following description with reference to the accompanying drawings in which.

Figure 1:
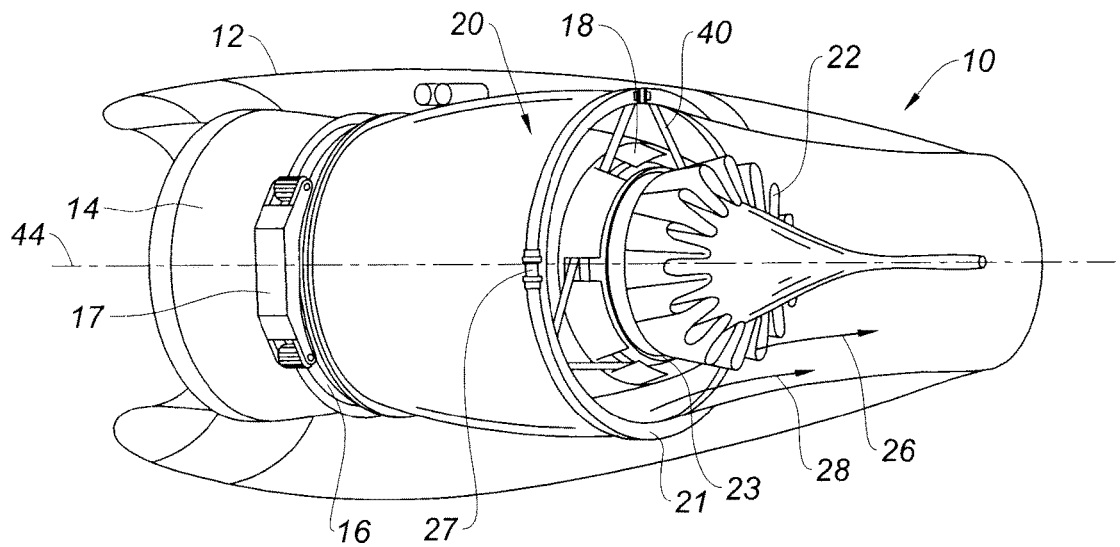
FIG. 1 is a schematic perspective view of a bypass turbojet engine.
Figure 3:
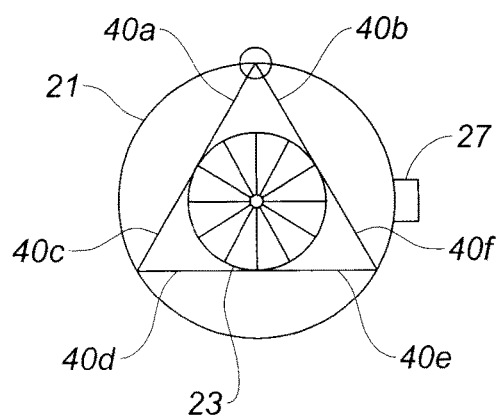

FIG. 3 schematically shows a cross-section of the jet engine in FIG. 1 through a plane that passes through the two rings and the trellis.

Figure 4:
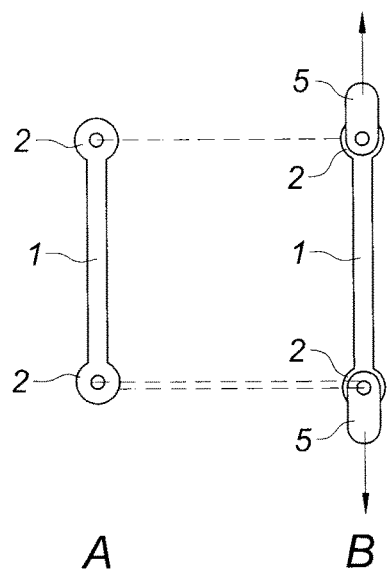
Figure 4:
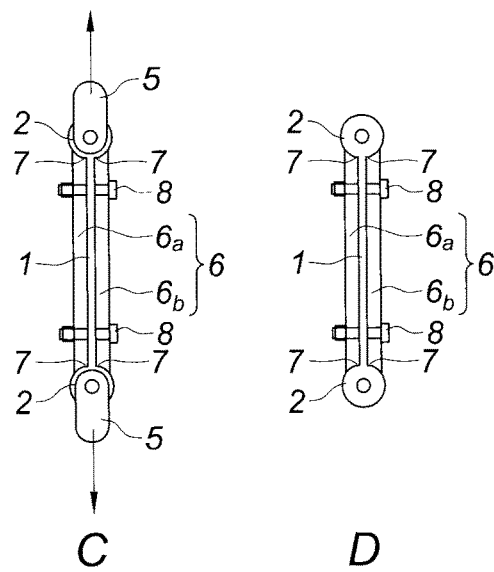

FIG. 4 shows the steps of the process of pre-stressing a connecting rod according to a first embodiment.

Figure 5:
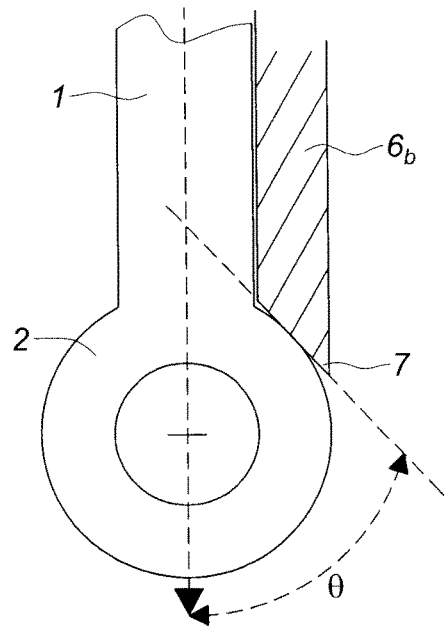

FIG. 5 shows the form of the tool for maintaining the pre-stressing near a yoke of the connecting rod.

Figure 6:
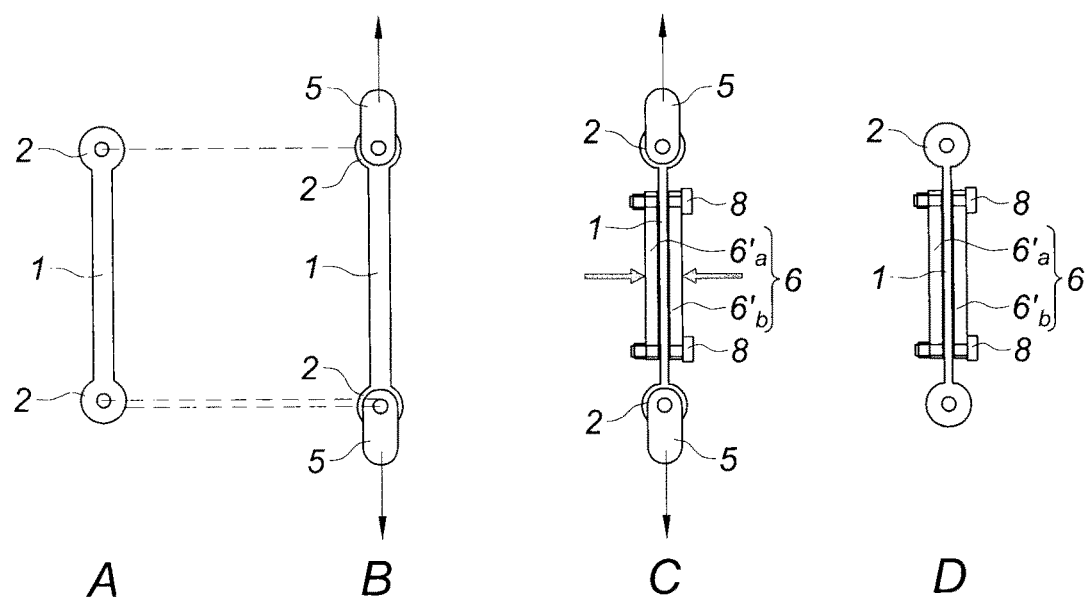

FIG. 6 shows the steps of the process for pre-stressing a connecting rod according to a second embodiment.

Figure 2:
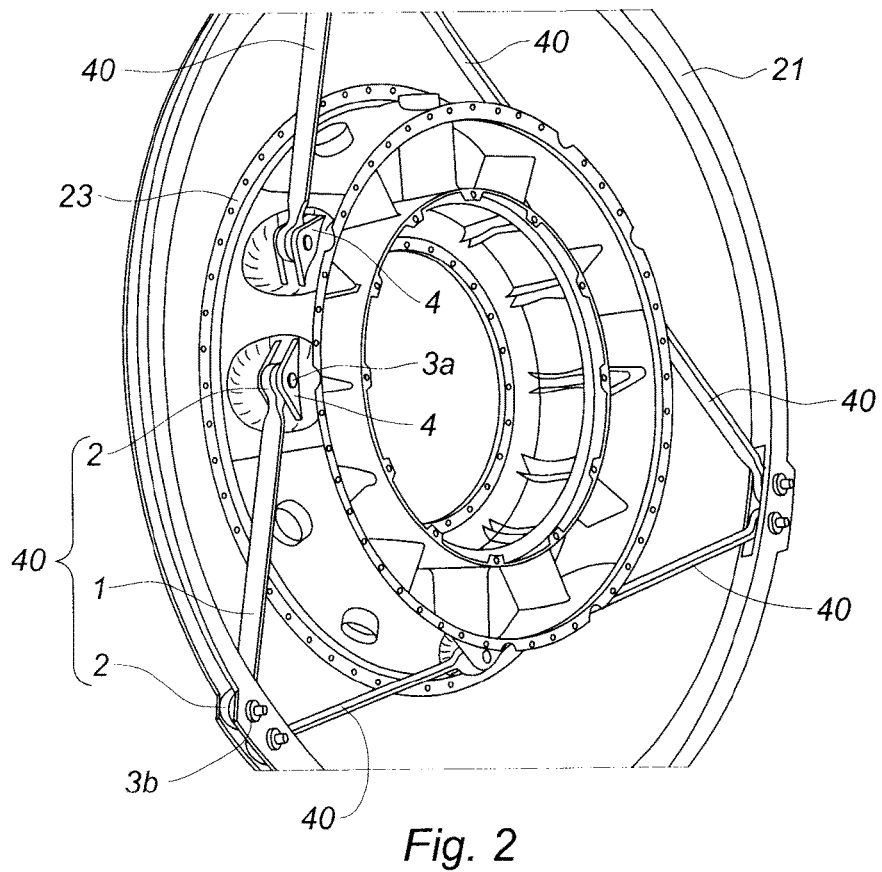
FIG. 2 is a perspective view of an exhaust housing, suspended on the ring of the outer secondary flow duct by a trellis of connecting rods according to an embodiment that corresponds to the prior art.

In the example shown in FIGS. 1 and 2, the structural ring 21 of the outer envelope of the fan duct and the ring formed by the ring 23 of the exhaust housing have the same axis as the overall axis of symmetry 44 of the turbojet engine. Connecting rods 40 are fixed to the two rings by their ends. A connecting rod 40 consists of a spindle 1 contained between two fixing yokes 2. Each system for fixing to the inner ring 23 comprises, as is known and illustrated in FIG. 2, a yoke 4 which is rigidly connected to the ring 23 and another yoke 2 at the end of the connecting rod 40, the two yokes 2 and 4 being passed through by a pin 3a. In the example in FIG. 2, the system for fixing the connecting rod 40 to the outer ring 21 comprises a yoke 2 on the connecting rod, two coaxial holes in two circles that face each other and form part of the structure of the ring 21, the entire unit being passed through by a pin 3b. As can be seen in FIG. 3, the connection consists more specifically of three pairs of connecting rods 40 tangential to the ring 23 of the exhaust housing and converging in pairs on the outer structural ring 21. The degrees of freedom introduced by rotation about the pins of the fixing systems enable the structure to absorb any expansion of the structures when the engine is operating.

According to the method of the present invention, the connecting rods are mounted in a pre-stressed state in this configuration between the rings, usually when inoperative, for example on the turbojet engine when it is inoperative or being assembled. The pre-stressing level is determined by calculating the stresses in the connecting rods of the trellis for what are known as ultimate load situations, such as typically the loss of an engine blade, and by adjusting this pre-stressing level to reduce the compression stresses to which each connecting rod is subjected. The maximum stress can be applied in any direction about the axis of the two rings. All the connecting rods 40 are therefore affected by the problem of buckling and they are all pre-stressed. Furthermore, identical pre-stressing of the connecting rods allows good centring of the exhaust housing relative to the structural ring to be obtained.

Preferably, the connecting rods used to produce a suspension trellis according to the invention have a solid cross-section. The level of buckling stress makes it possible to produce them with a cross-section which is sufficiently small for the mass to space requirement ratio to be better than for a hollow spindle. Typically, the mass is identical but the master cross-section is halved compared with a hollow connecting rod, and in particular its manufacturability is markedly improved. For the purposes of aerodynamics, the spindle 1 is profiled and slightly flattened about a plane perpendicular to the plane of the yokes 2 of the two ends as can be seen in FIG. 2.

Preferably, the means used to pre-stress the connecting rods is an actuator of the type used for traction testing and the pre-stressing is produced with this actuator outside the engine environment. As shown in B of FIG. 4, pre-stressing is applied by the jaws 5 of this actuator to the yokes 2 of the connecting rod. The connecting rod pre-stressed in this way in B of FIG. 4, corresponds to a slight separation of the yokes 2 compared with the inoperative connecting rod in A of FIG. 4.

According to a first embodiment, shown in C of FIG. 4, means 6 for maintaining the separation are installed between the yokes 2, around the spindle 1 and with faces 7 which rest on the inner portion of the yokes 2 projecting beyond the spindle 1. The distance between said faces 7 is adjusted to correspond to the separation of the yokes 2 for the spindle 1 pre-stressed in this way and held rigid by the separation means 6. The separation means 6 are rigidly connected to the connecting rod 40 by locking means 8 so that said connecting rod remains in position when the stress applied to the yokes 2 by the jaws 5 of the actuator is subsequently relaxed. In D of FIG. 4, the locked separation means 6 only maintain the connecting rod 40 in the extended position, and it can therefore be transported with the desired pre-stressing for subsequent mounting on the engine.

Preferably, the separation maintaining means 6 consist of two shells $6_a$ and $6_b$ produced with the correct length to correspond to the state of stress chosen for the connecting rod 40. The shells are locked to one another, for example by screw systems 8. Each shell, $6_a$ and $6_b$, forms a beam element that is resistant to buckling between the contact surfaces 7. Furthermore, the hollow form of the cylinder that they form around the spindle of the connecting rod allows the size of the cross-section of said cylinder to be approximately the same as that of the yokes 2, while resisting the buckling stress imposed by the pre-stressed connecting rod.

Finally, the faces 7 in contact with the yokes 2 are bevelled towards the inside. Referring to FIG. 5, this corresponds to the fact that this face 7, of the shell $6_b$ for example, is situated in a plane which is at an acute angle θ to the axis of the spindle 1, oriented towards the end corresponding to said face. Therefore when the locking means 8 between the shells $6_a$ and $6_b$ are removed, the two shells separate naturally under the effect of the retraction of the connecting rod.

This small space requirement, plus the fact that the cylinder formed by the two shells $6_a$ and $6_b$ terminates inside the yokes 2, allows the connecting rod 40 to be fixed in the trellis with the separation maintaining means 6 installed. For example, for the configuration shown schematically in FIGS. 2 and 3, when the six pre-stressed connecting rods (40a, 40b, 40c, 40d, 40e, 40f) have been assembled to form the trellis between the rings 21 and 23, the locking means 8 need only be unlocked to remove from each connecting rod the portions $6_a$ and $6_b$ of the means 6 for maintaining the separation from the yokes.

In a second embodiment, illustrated in FIG. 6 during step C, the two elements $6'_a$ and $6'_b$ are tightened firmly on the spindle 1 of the connecting rod by the locking means 8'. In this way, they apply friction preventing the spindle 1 from retracting when the actuator is removed during step D. In this embodiment, the locking means are therefore dimensioned to apply sufficient pressure to the spindle. The surface condition of the two elements $6'_a$ and $6'_b$ can be adjusted to improve the buttressing effect on the spindle. In this embodiment, the elements $6'_a$ and $6'_b$ must have a length equivalent to that of the spindle in order to maintain the separation but they must not come into contact with the yokes. This may have advantages compared with the previous example if the inner faces of the yokes do not provide sufficient support or if the space requirement in the region of the fixing systems on the turbojet engine does not leave enough space for a device that touches the yokes.

The method and suitable devices have been described for a configuration, shown in FIGS. 1, 2 and 3, with six connecting rods tangential to the ring on the housing 23. It is also within the scope of the invention to use pre-stressed connecting rods for the other types of hyperstatic trellises mentioned in the introduction, where there may be a different number of connecting rods that are radial or are not tangential to the housing. The invention also applies to the case where the structural ring 21 on which the ring 23 of the inner housing is suspended is close to the ring 23, beneath the inner wall of the secondary flow duct. This configuration is used for example for suspending large bypass engines beneath the wings of a civil aeroplane. As the geometry of the trellis is different where the two rings are close, the pre-stressing levels must be adjusted.

The invention claimed is:

1. A method of manufacturing an assembly comprising a first structure arranged to be rigidly connected to a housing of a turbojet engine, a second annular structure surrounding the first structure, and a hyperstatic trellis comprising a plurality of connecting rods, the plurality of connecting rods maintaining the first structure relative to the second annular structure, said method comprising;
   mounting said plurality of connecting rods of the hyperstatic trellis between said first structure and said second annular structure;
   pre-stressing at least one of said plurality of connecting rods to a predetermined level; carried out before the mounting of said plurality of connecting rods between said first structure and said second annular structure, said pre-stressing corresponding to a slight lengthening of said at least one of said plurality of connecting rods thereby placing said at least one of said plurality of connecting rods in a pre-stressed state; and
   maintaining the pre-stressed state of said at least one of said plurality of connecting rods during mounting of said at least one of said plurality of connecting rods between said first structure and said second annular structure.

2. The method of manufacturing an assembly according to claim 1, wherein each of said plurality of connecting rods comprises a spindle, a first end, and a second end, each of the first end and the second end being connected to a corresponding first and second yoke, each yoke being suitable for fixing to one of said first structure and said second annular structure, said pre-stressing step comprising:
placing the yokes of said at least one of said plurality of connecting rods in jaws of a traction actuator;
applying the pre-stressing at said predetermined level to the yokes of at least one of said plurality of connecting rods by operating said traction actuator;
installing shells around the spindle of said at least one of said plurality of connecting rods and locking the shells to each other to maintain separation of the yokes while the traction actuator maintains the pre-stressing at said predetermined level; and
releasing the pre-stressing applied to the yokes of said at least one of said plurality of connecting rods by the traction actuator.

3. The method of manufacturing an assembly according to claim 2, further comprising removing the shells after said at least one of said plurality of connecting rods is mounted, wherein the removing the shells includes the shells from each other.

4. The method of manufacturing an assembly according to claim 2, wherein the shells comprise at least one non-deformable element extending along the spindle over most of a length of the spindle.

5. The method of manufacturing an assembly according to claim 4, fasteners retain the shells along the spindle in order to maintain the separation of the yokes.

6. The method of manufacturing an assembly according to claim 4, wherein each of said first and second yokes have a larger cross-section than the spindle in at least one direction perpendicular to the spindle, and wherein each shell has at least two contact surfaces which are oriented outwards in opposite directions and suitable for resting on a face of each of said first and second yokes which is turned towards the spindle.

7. The method of manufacturing an assembly according to claim 4, wherein fasteners apply pressure to the shells against the spindle, preventing said spindle from retracting by friction against the non-deformable element.

8. The method according to claim 2, wherein each connecting rod of said plurality of connecting rods is profiled and slightly flattened about a plane perpendicular to a plane of each of said yokes.

9. The method according to claim 1, wherein the plurality of connecting rods comprises three pairs of connecting rods which are tangential to the first structure and converging in the pairs on the second annular structure.

10. The method according to claim 1, wherein said plurality of connecting rods is arranged in a triangular shape between the first structure and the second annular structure, said plurality of connecting rods being tangential to the first structure.

11. The method according to claim 1, wherein predetermined level is determined by calculating the stresses in the plurality of connecting rods for an ultimate load situation.

12. The method according to claim 1, wherein each connecting rod of the plurality of connecting rods has a solid cross-section.

13. The method of manufacturing an assembly according to claim 2, wherein a maintaining device for maintaining the separation of the yokes of the spindle comprises shells which comprises non-deformable elements extending along the spindle over most of a length of the spindle.

14. The method of manufacturing an assemble according to claim 13, wherein fasteners retain the shells along the spindle in order to maintain the separation of the yokes.

15. The method of manufacturing an assembly according to claim 13, wherein said yokes have a larger cross-section than the spindle in at least one direction perpendicular to the spindle, and wherein each shell has at least two contact surfaces which are oriented outwards in opposite directions and suitable for resting on a face of each of said yokes which is turned towards the spindle.

16. The method of manufacturing an assembly according to claim 13, wherein fasteners apply pressure to the shells against the spindle, preventing said spindle from retracting by friction against the at least one non-deformable element.

17. A method of manufacturing an assembly comprising a first structure arranged to be rigidly connected to a housing of a turbojet engine, a second annular structure surrounding the first structure, and a hyperstatic trellis comprising a plurality of connecting rods, the plurality of connecting rods maintaining the first structure relative to the second annular structure, said method comprising:
mounting said plurality of connecting rods of the hyperstatic trellis between said first structure and said second annular structure; and
pre-stressing at least one of said plurality of connecting rods to a predetermined level, carried out before the mounting of said plurality of connecting rods between said first structure and said second annular structure,
wherein each of said plurality of connecting rods comprises a spindle, a first end and a second end, each first end and second end being connected to a corresponding first and second yoke, each yoke being suitable for fixing to one of said first structure and said second annular structure,
wherein said pre-stressing comprises:
placing each of the first and second yokes of said at least one of said plurality of connecting rods in jaws of a traction actuator;
applying the pre-stressing at said predetermined level to the first and second yokes of said at least one of said plurality connecting rods by operating said traction actuator;
installing shells around the spindle of said at least one of said plurality of connecting rods and locking the shells to each other to maintain separation of the first and second yokes while the traction actuator maintains the pre-stressing at said predetermined level; and
releasing the pre-stressing applied to the first and second yokes of said at least one of said plurality of connecting rods by the traction actuator, and
wherein the method further comprises removing the shells after said at least one of said plurality of connecting rods is mounted.

18. A method of manufacturing an assembly comprising a first structure arranged to be rigidly connected to a housing of a turbojet engine, a second annular structure surrounding the first structure, and a hyperstatic trellis comprising a plurality of connecting rods, the plurality of connecting rods maintaining the first structure relative to the second annular structure, said method comprising:

mounting said plurality of connecting rods of the hyperstatic trellis between said first structure and said second annular structure;

pre-stressing at least one of said plurality of connecting rods to a predetermined level forming a lengthened state of the at least one of said plurality of connecting rods, carried out before the mounting of said plurality of connecting rods between said first structure and said second annular structure; and releasing the pre-stressing of the said at least one of said plurality of connecting rods when all the plurality of connecting rods are installed.

\* \* \* \* \*

UNITED STATES PATENT AND TRADEMARK OFFICE
CERTIFICATE OF CORRECTION

PATENT NO. : 10,132,241 B2  Page 1 of 1
APPLICATION NO. : 14/320795
DATED : November 20, 2018
INVENTOR(S) : Francois Robert Bellabal et al.

It is certified that error appears in the above-identified patent and that said Letters Patent is hereby corrected as shown below:

In the Claims

Column 6, Line 59, change "level; carried" to --level, carried--;

Column 7, Line 14, change "yokes of at least" to --yokes of said at least--;

Column 7, Line 28, change "includes the shells" to --includes unlocking the shells--;

Column 7, Line 35, change "fasteners retain" to --wherein fasteners retain--;

Column 8, Line 6, change "an assemble" to --an assembly--; and

Column 9, Line 11, change "all the plurality" to --all of the plurality--.

Signed and Sealed this
Twelfth Day of November, 2019

Andrei Iancu
*Director of the United States Patent and Trademark Office*